United States Patent
Fukuzawa et al.

(10) Patent No.: US 7,633,264 B2
(45) Date of Patent: Dec. 15, 2009

(54) BATTERY CONTROL APPARATUS AND METHOD FOR PREVENTING OVERDISCHARGE

(75) Inventors: Tatsuhiro Fukuzawa, Yokohoma (JP); Yuuji Tanjou, Yokohoma (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 332 days.

(21) Appl. No.: 11/708,066

(22) Filed: Feb. 20, 2007

(65) Prior Publication Data

US 2007/0194754 A1 Aug. 23, 2007

(30) Foreign Application Priority Data

Feb. 21, 2006 (JP) ............................... 2006-043704

(51) Int. Cl.
H01M 10/46 (2006.01)
(52) U.S. Cl. ..................................................... 320/116
(58) Field of Classification Search ................. 320/104, 320/116, 128, 132, 150, 112
See application file for complete search history.

(56) References Cited

U.S. PATENT DOCUMENTS 5,132,606 A * 7/1992 Herbert ....................... 323/266
2002/0024319 A1 * 2/2002 Haraguchi et al. .......... 320/122

FOREIGN PATENT DOCUMENTS

JP 2004-166367 6/2004

* cited by examiner

Primary Examiner—Edward Tso
(74) Attorney, Agent, or Firm—Drinker Biddle & Reath LLP

(57) ABSTRACT

A battery pack control apparatus for a battery pack that includes a plurality of unit cells electrically connected in series prevents overdischarging based on the total voltage of the battery pack, as opposed to being based on the separate voltages of the individual unit cells. When a total voltage of the battery pack corresponds to a lowest voltage of one of the plurality of unit cells decreasing to a predetermined threshold at which overdischarging would begin to occur, power supply to a load from the battery pack is at least partially restricted.

13 Claims, 5 Drawing Sheets

BATTERY CONTROL APPARATUS AND METHOD FOR PREVENTING OVERDISCHARGE

CROSS-REFERENCE TO RELATED APPLICATIONS

This application claims priority under 35 U.S.C. § 119 to Japanese Patent Application No. 2006-043704, filed on Feb. 21, 2006, the disclosure of which is incorporated by reference herein in its entirety.

BACKGROUND OF THE INVENTION

1. Field of the Invention

The present invention relates to a battery pack control apparatus and battery pack control method for controlling a battery pack including a plurality of unit cells that are electrically connected in series.

2. Description of Related Art

In a related starting system for an internal combustion engine, a battery pack includes a plurality of unit cells that are electrically connected in series. If one or more unit cells becomes overdischarged in the course of supplying power (i.e., during normal discharge of power) to an electric starting motor for the engine, then the remaining capacity of the battery pack may be reduced to such an extent as to make it difficult to start the engine. As it is used herein, the term "overdischarged" refers to supplying power beyond the proper unit cell voltage, i.e., at or below a minimum voltage for the unit cell. Overdischarging may occur due to insufficient capacity of a battery pack that causes the battery pack to be overworked, and may reduce the cycle life of the battery pack.

In a related battery pack control apparatus, separate voltage detectors for each unit cell sense a reduction in voltage equal to or less than a predetermined voltage in an individual unit cell. When a load is applied to the related battery pack control apparatus, power that is supplied by a battery pack may be restricted when the voltage of any unit cell is detected by its corresponding detector to be equal to or less than the predetermined voltage. Thus, the related battery pack control apparatus suffers from a number of disadvantages as a result of providing separate detectors for each unit cell, including increases in the size and cost of the related battery pack control apparatus.

BRIEF SUMMARY OF THE INVENTION

A battery pack control apparatus is provided for a battery pack that includes a plurality of unit cells that are electrically connected in series. In lieu of separate detectors (i.e., detector for detecting a reduction in voltage of unit cell to be equal to or less than the predetermined voltage) for each unit cell, the battery pack control apparatus includes a first voltage detecting unit that senses a first voltage corresponding to a voltage of the battery pack, a second voltage detecting unit that determines a second voltage corresponding to a voltage of the battery pack when a voltage of at least one of the plurality of unit cells is reduced to be equal to or less than a predetermined voltage, and a power restricting unit that restricts power supplied from the battery pack to an external device in the event that the first voltage becomes equal to or less than the second voltage.

In accordance with at least one embodiment of the present invention, it is unnecessary to provide separate detectors for each unit cell of a battery pack. Instead, it is sufficient to provide a detector that senses reductions in the total voltage of the battery pack, i.e., the voltage of the entirety of the battery pack, to be equal to or less than a predetermined voltage (i.e., second voltage). Consequently, a battery pack control apparatus according to this embodiment may avoid the disadvantages of the related battery pack control apparatus.

In accordance with an aspect of an embodiment of the invention, there is provided a battery pack control apparatus for supplying power from a battery pack to a load. The battery pack includes a plurality of unit cells that are electrically connected in series. The battery pack control apparatus includes a first voltage detecting unit that senses a first voltage, a second voltage detecting unit that determines a second voltage, and a power control unit that restricts the power supplied from the battery pack to the load in response to the second voltage being greater than the first voltage. The first voltage corresponds to a voltage of the battery pack. The second voltage corresponds to a voltage of the battery pack when voltage of at least one unit cell of the plurality of unit cells becomes a predetermined voltage.

In accordance with another aspect of an embodiment of the invention, there is provided a battery pack control apparatus for supplying power from a battery pack to a load. The battery pack includes a plurality of unit cells that are electrically connected in series. The battery pack control apparatus includes first voltage detecting means for sensing a total voltage output of the battery pack, second voltage detecting means for determining a threshold voltage of the battery pack when a voltage of at least one unit cell of the plurality of unit cells becomes a predetermined voltage, and power control means for at least partially restricting the power supplied from the battery pack to the load in response to the total voltage being equal to or less than the threshold voltage.

In accordance with yet another aspect of an embodiment of the invention, there is provided a method of controlling a supply of power from a battery pack to a load. The battery pack includes a plurality of unit cells that are electrically connected in series. The method includes sensing a first voltage of the battery pack, determining a second voltage of the battery pack when a voltage of a lowest voltage unit cell of the plurality of unit cells becomes a predetermined voltage corresponding to overdischarging the battery pack, and restricting the power being supplied from the battery pack to the load when the first voltage of the battery pack is equal to or less than the second voltage.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

Activating a load that is connected to a battery pack, which includes a plurality of unit cells that are electrically connected in series, reduces the voltage of the respective unit cells while power is supplied to the load. Consider the undesirable case, for example, in which the open-circuit voltage (i.e., before the load is activated) of one of the unit cells is relatively smaller than the other unit cells, or in which the internal resistance of one of the unit cells is relatively greater than the other unit cells, whereby the voltage of the one unit cell may be reduced to cause overdischarge. According to an embodiment, there is provided a two-step process configuration. First, a threshold voltage (also called a "predetermined voltage") is determined for each of the plurality of constituent unit cells of the battery pack. That is, the voltage of each unit cell at which overdischarging begins to occur is determined as the threshold or predetermined voltage. In addition, the total voltage of the battery pack (i.e., the voltage of the entire battery pack) in the event that any one of the unit cells falls to or below the threshold value is determined as a total voltage threshold value (also referred to hereinafter as a "second voltage"). Second, the supply of power while activating the load (also referred to hereinafter as an "external device") is restricted, i.e., partially or completely, at the time when the total voltage of the battery pack is reduced to the total voltage threshold value.

Figure 2:
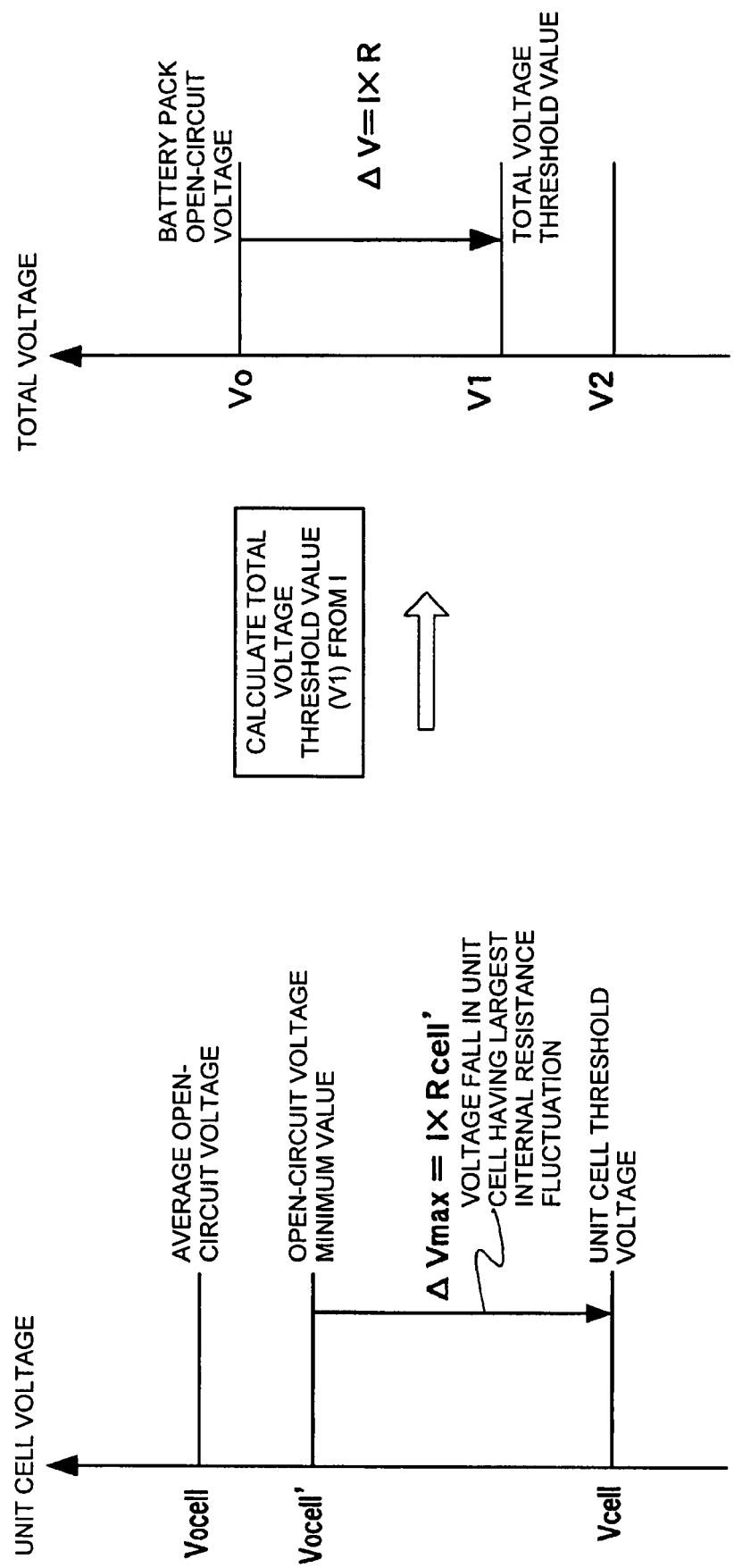
FIG. 2A is an explanatory diagram illustrating voltage variations of unit cells during a load driving event.
FIG. 2B is a diagram illustrating a relationship between a total voltage threshold value of a battery pack and an open-circuit voltage of the battery pack.

With reference to FIG. 2, an embodiment of the procedures for determining the total voltage threshold value will now be described. The total voltage threshold value V1 can be expressed by Equation (1) as follows:

$$V1 = Vo - I \times R \quad (1)$$

where V1 denotes the total voltage threshold value (second voltage) of the battery pack during load activation; Vo denotes an open-circuit voltage (no-load voltage) of the battery pack; I denotes an output current of the battery pack; and R denotes an internal resistance of the battery pack.

The internal resistance R of the battery pack may be measured while the battery pack is in use. Alternatively, the internal resistance R can be calculated from data that is determined when the battery pack is manufactured and that is stored in a control map registered in a memory (e.g., memory 208 shown in FIG. 1). Such a memory may be included in the battery pack during its manufacture. Further, the internal resistance R read from the control map may be corrected for in accordance with, for example, time variations and/or temperature variations.

The open-circuit voltage Vo of the battery pack may be measured at an output terminal of the battery pack without the load connected. Alternatively, the open-circuit voltage Vo may be determined by totaling the respective voltages of the plurality of unit cells of the battery pack without the connected load.

The output current I of the battery pack will be described below.

A unit cell threshold voltage Vcell is expressed by Equation (2) as follows:

$$Vcell = Vocell' - I \times Rcell' \quad (2)$$

where Vocell' denotes an open-circuit voltage of the one of the plurality of constituent unit cells of the battery pack with the greatest deviation from an average value of the plurality of constituent unit cells of the battery pack before load activation (i.e., a lowest one of the open-circuit voltages of the plurality of unit cells); and Rcell' denotes internal resistance of the one of the plurality of unit cells having the maximum internal resistances before load activation.

Accordingly, the output current I of a unit cell with both the lowest open-circuit voltage and the maximum internal resistance may be determined by Equation (3) as follows:

$$I = (Vocell' - Vcell)/Rcell' \quad (3)$$

That is, if there exists a unit cell having the lowest open-circuit voltage and the maximum internal resistance, then the unit cell has the lowest output voltage during load activation, and the output current value of the unit cell may be calculated. The output current value can, of course, also be calculated in the following manner. The voltages corresponding to each of the unit cells during load activation are calculated from the open-circuit voltages and internal resistances of each of the unit cells. Then, the calculated voltages corresponding to each of the unit cells during load activation are compared with one another to thereby designate a unit cell having the lowest voltage during load activation, and the output current value is then calculated by using the open-circuit voltage and internal resistance of the designated unit cell. However, the latter of the aforementioned methods may take longer than desired. Preferably, the output current value is calculated by assuming that, as described above, there exists a unit cell having the lowest open-circuit voltage and the maximum internal resistance.

The threshold voltage Vcell of the unit cell is a predetermined voltage relative to a particular condition. For example, the threshold voltage Vcell may be a voltage at which there is likely to occur irreversible deterioration of the battery due to overdischarge of the unit cell, or it is a voltage selected on the basis of the voltage or the like necessary to supply power during the next load activation. In the present specification, the phenomenon of reduction in the unit cell voltage to the threshold voltage or lower is preferably defined in terms of "overdischarge" and its variations.

The internal resistance Rcell' may be determined in the following manner. Internal resistances of each of a plurality of unit cells may be determined through experimentation or the like in the manufacture of the unit cells, and the one of the plurality of unit cells having the maximum internal resistance may be estimated accordingly. In some cases, the internal resistance Rcell' may fluctuate due to, for example, temperature variations and/or time variations. In order to compensate for such environmental variations, the maximum value of the internal resistances Rcell' for each one of the plurality of unit cells may be determined by measuring internal resistances of the respective unit cells during actual operation. Alternatively, variations in the internal resistances that correspond to different temperatures may be preliminarily determined by experimentation or the like during manufacture of the unit cell. For example, the data obtained in the unit cell manufacture may be used to correct for variations in the temperature that is detected, whereby the maximum internal resistance may be determined based on the detected temperature. According to yet a further alternative, the lowest one of the open-circuit voltages of the plurality of unit cells may be determined as follows. For each of the unit cells, the remaining capacity (also referred to as "state of charge" or "SOC") of the respective unit cells may be measured and stored before the load is connected to the battery pack. The lowest one of the open-circuit voltages is determined based on the lowest detected SOC that is stored.

FIG. 2A shows the relationships between the respective voltages of a unit cell. According to FIG. 2A, the open-circuit voltage (also called the "no-load voltage") of each of the plurality of constituent unit cells of the battery pack are distributed upward and downward with respect to the average open-circuit voltage Vocell, which is an average value of the open-circuit voltages of the plurality of unit cells. Only the lowest one of the open-circuit voltages Vocell' of the plurality of unit cells is shown below the average open-circuit voltage Vocell. Assuming that the unit cell that has the lowest open-circuit voltage value Vocell' also has the highest internal resistance, a differential voltage ΔVmax between the threshold voltage Vcell of the unit cell and the lowest open-circuit voltage Vocell' is expressed by Equation (4) as follows:

$$\Delta V\text{max} = I \times R\text{cell}' \quad (4)$$

Accordingly, a current value I during load activation can be determined from the differential voltage ΔVmax in the unit cell voltage due to the presence or absence of the load activation and the unit cell internal resistance Rcell'. The plurality of constituent unit cells of the battery pack are all electrically connected in series, thus the current value I is substantially equal to the output current of the battery pack. Consequently, the total voltage threshold value V1 shown in FIG. 2B may be determined based on the current value I. More specifically, the total voltage threshold value V1 of the battery pack may be determined by subtracting the voltage reduction amount (ΔV=I×R) from the open-circuit voltage Vo of the battery pack.

First Embodiment

Figure 1:
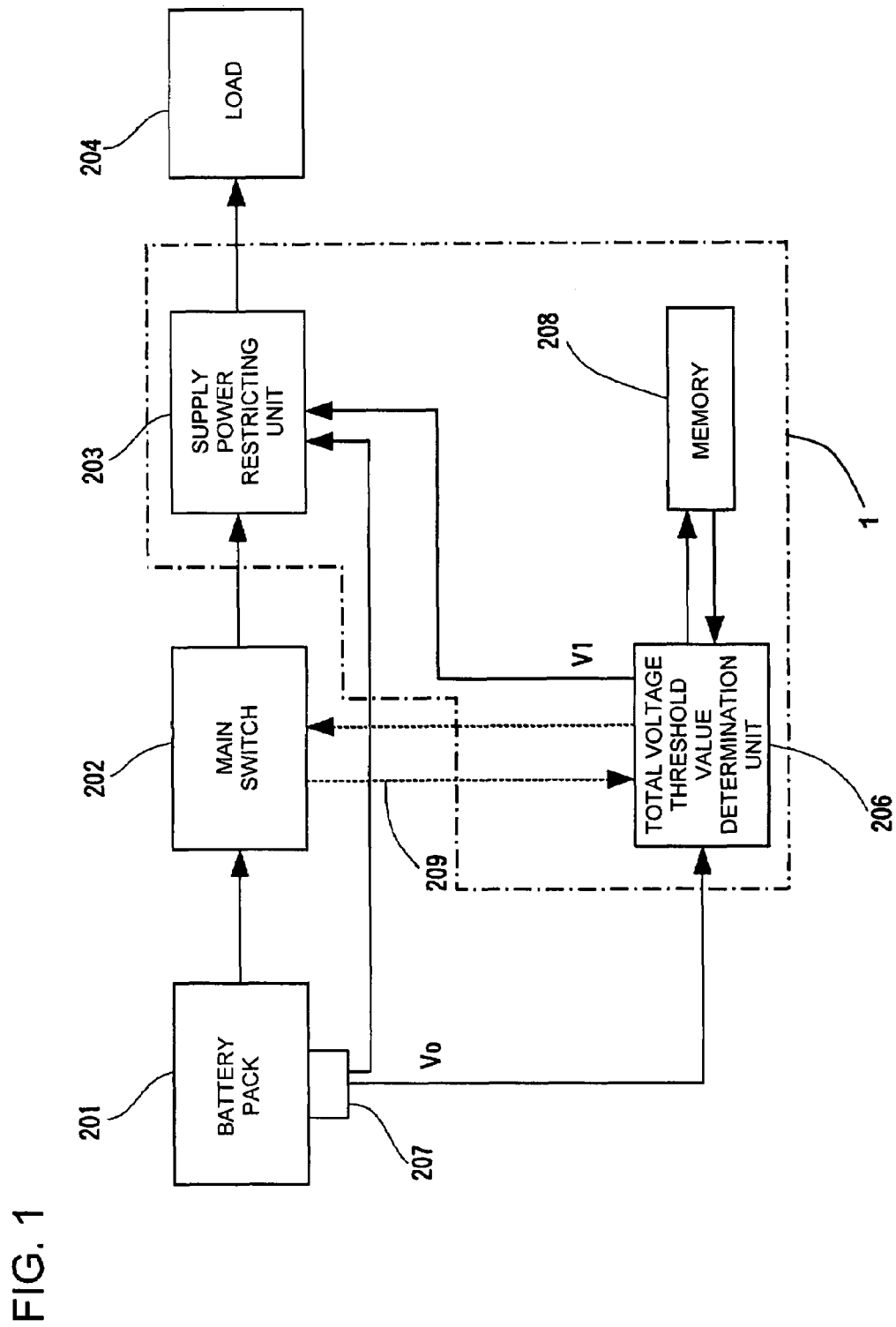
FIG. 1 is a block diagram of a system including a battery pack control apparatus in accordance with an embodiment of the present invention.

FIG. 1 is a block diagram of a system that includes a battery pack control apparatus according to one embodiment wherein the total voltage threshold value V1 (second voltage), as was determined above, is used to determine the discharge power of a battery pack. With reference to FIG. 1, the system includes a battery pack control apparatus 1, a battery pack 201, a voltage sensor 207 (also called a "first voltage detecting unit") that provides a means for detecting a voltage, a main switch 202, and a load 204 (i.e., an external device such as an electric motor). A power supply (not shown) that is separate from the battery pack 201 may supply power to operate the main switch 202 and the battery pack control apparatus 1.

An output of the battery pack 201 is connected to the load 204 via the main switch 202 and a supply power restricting unit 203. Preferably, the load 204 includes an electric starter motor for an engine of a motor vehicle. Turning the main switch 202 ON electrically connects the load 204 and the battery pack 201, and turning the main switch 202 OFF electrically disconnects the load 204 and the battery pack 201. A control signal indicative of the ON/OFF state of the main switch 202 is sent to the battery pack control apparatus 1 through a connection line 209.

The voltage sensor 207 continuously detects the output voltage of the battery pack 201.

The battery pack control apparatus 1 includes a total voltage threshold value determination unit 206 (also called a "second voltage detecting unit") that provides a means for determining a total voltage threshold, a memory 208, and the supply power restricting unit 203 (also called a "power control unit") that provides a means for at least partially restricting supply power.

The configuration of the battery pack control apparatus 1 will now be described. Upon being energized, the total voltage threshold value determination unit 206 verifies that the battery pack 201 is in a no-load state (that is, verifies that the main switch 202 is OFF) based on the control signal sent via the connection line 209. The total voltage threshold value determination unit 206 then reads the no-load voltage of the battery pack 201 that is detected by the voltage sensor 207. Then, the total voltage threshold value determination unit 206 determines a total voltage threshold value V1 in accordance with open-circuit voltages and internal resistances of the respective unit cells, which are stored in the memory 208, and sends the total voltage threshold value V1 to the supply power restricting unit 203. Further, the total voltage threshold value determination unit 206 inputs to the main switch 202 a timing signal that indicates that the total voltage threshold value V1 has been sent to the supply power restricting unit 203. In response to the timing signal, the main switch 202 turns ON and thereby electrically connects the load 204 and the battery pack 201.

During activation of the load 204, the supply power restricting unit 203 monitors an output voltage (also called a "first voltage") of the battery pack 201. The output voltage is detected by the voltage sensor 207. In the event that the output voltage of the battery pack 201 becomes equal to or less than the total voltage threshold value V1 (second voltage), the supply power restricting unit 203 restricts the power supplied from the battery pack 201 to the load 204. The supply power restricting unit 203 may partially restrict, i.e., decrease, the power supplied from the battery pack 201 to the load 204, or may completely restrict, i.e., shut off, the power supplied from the battery pack 201 to the load 204. According to the embodiment, the supply power restricting unit 203 restricts the power being supplied from the battery pack 201 to the load 204. Preferably, restricting supply current may be used to restrict the supply power. For setting the total voltage threshold value V1, the characteristics of open-circuit voltages and internal resistances of respective constituent unit cells of the battery pack 201 are necessary, as described above in conjunction with Equations (1) to (4). The memory 208 preliminarily stores open-circuit voltages and internal resistances of the respective constituent unit cells. More specifically, for the respective open-circuit voltages, the memory 208 may contain values representing the remaining capacity (SOC) of each unit cell when the main switch 202 was previously turned OFF, and for the respective internal resistance values, the memory 208 contains values determined at the time the unit cell was manufactured. Any one of various conventionally known methods can be employed for obtaining the open-circuit voltages and internal resistances. Provide separate voltage detectors (voltage sensors) for each unit cell of a battery pack and the voltages of each unit cell when the main switch 202 is turned OFF can be obtained by the voltage detectors for each unit cell and stored into the memory 208. Alternatively, the currents and voltages of each unit cell during the previous load activation may be measured, and values calculated in accordance with the relationships between the measured currents and voltages may be stored in the memory 208.

Figure 3:
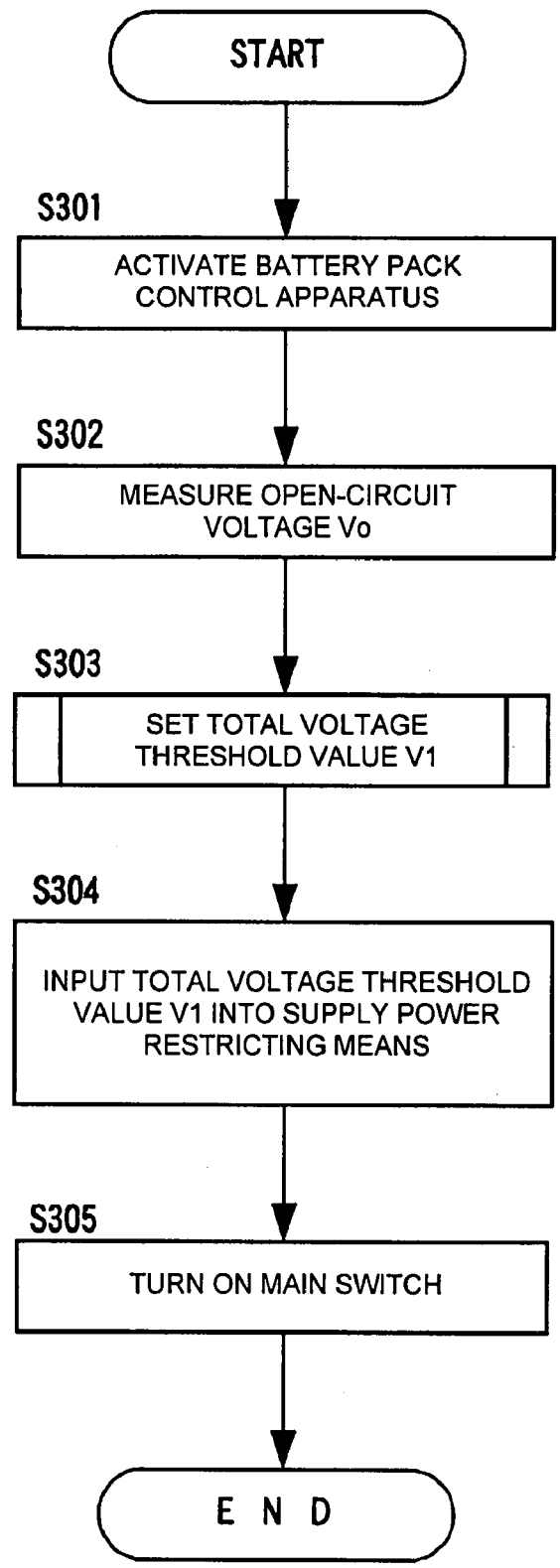
FIG. 3 is a flow chart illustrating control associated with a battery pack control apparatus such as depicted in FIG. 1.

FIG. 3 is a flow chart showing a processing procedure with the battery pack control apparatus 1 shown in FIG. 1. The battery pack control apparatus 1 is activated (step S301) when an ignition switch (not shown) is turned ON by a vehicle operator (also called simply "operator") and power is supplied to the battery pack control apparatus 1, e.g., from a separate power supply (not shown). It is assumed that the main switch 202 is turned OFF and that the battery pack 201 is in a no-load state. Open-circuit voltages Vo are detected (step S302) by the voltage sensor 207 connected at a battery pack output terminal in the no-load state of the battery pack 201. The total voltage threshold value V1 is set (step S303) by the total voltage threshold value determination unit 206 based on the open-circuit voltages Vo and the data (e.g., open-circuit voltages and internal resistances of the respective unit cells) stored in the memory 208. Preferably, the total voltage threshold value V1 is calculated by the total voltage threshold value determination unit 206 using the relationships expressed in Equations (1) to (4). Setting of the total voltage threshold value V1 is accomplished when the total voltage threshold value determination unit 206 supplies the set value to the supply power restricting unit 203. Thereafter, a control signal is sent to the main switch 202 to turn ON (step S304). Finally, the start-up setting or initialization of the battery pack control apparatus 1 terminates, and the load 204 and the battery pack 201 are electrically connected.

Second Embodiment

Although it is desirable for the battery pack to supply only the current required by the load, it is contemplated that the battery pack may supply more current (also called "overcurrent") than is required by the load.

A method of avoiding an overcurrent supply will now be described. In the battery pack control apparatus 1 shown in FIG. 1, the total voltage threshold value determination unit 206 may additionally determine an overcurrent threshold voltage V2 (also called a "third voltage").

Preferably, the total voltage threshold value determination unit 206 calculates the overcurrent threshold voltage by Equation (5) as follows:

$$V2 = Vo - Imax \times R \quad (5)$$

where Vo denotes the open-circuit voltage of the battery pack described above; R denotes the internal resistance of the battery pack 201; and Imax denotes the allowable maximum current value as the maximum value (withstand current) of load-allowable currents.

The overcurrent threshold voltage V2 is a voltage of the battery pack 201 that occurs when a maximum allowable current value Imax is output from the battery pack 201. The total voltage threshold value determination unit 206 compares the overcurrent threshold voltage V2 and the total voltage threshold value V1, and sends the higher value to the supply power restricting unit 203. In response, the supply power restricting unit 203 compares the output voltage of the battery pack with the higher one of the overcurrent threshold voltage V2 and the total voltage threshold value V1 that has been sent from the total voltage threshold value determination unit 206.

As for the allowable maximum current value Imax, a predetermined value corresponding to the load is preliminarily stored in the memory 208. The total voltage threshold value determination unit 206 calculates the overcurrent threshold voltage V2 based on the allowable maximum current value Imax retrieved from the memory 208.

The supply power restricting unit 203 partially or completely restricts the supply of power from the battery pack 201 to the load 204 based on the one of the overcurrent threshold voltage V2 and total voltage threshold value V1 that has been sent from the total voltage threshold value determination unit 206. That is, when the output voltage of the battery pack 201 becomes equal to or lower than any one of the overcurrent threshold voltage V2 and the total voltage threshold value V1, the supply power restricting unit 203 partially or completely restricts power output from the battery pack 201 to the load 204. Accordingly, the battery pack 201 is prevented from supplying overcurrent to the load and from overdischarging.

Third Embodiment

The internal resistance of the battery pack may be temperature dependent, such as may be the case, for example, in a battery pack for a motor vehicle that is subjected to significant temperature variations between summer and winter seasons. Preferably, internal resistance variations of the battery pack during actual operation may be taken into account. A temperature sensor (not shown) may be provided to the battery pack 201, whereby an overcurrent threshold voltage V2 of the battery pack 201 can be determined that is based on the output of the temperature sensor. More specifically, the overcurrent threshold voltage V2 at a temperature t detected by the temperature sensor may be determined in accordance with Equation (6) as follows:

$$V2 = Vo - Imax \times R(t) \quad (6)$$

where R(t) denotes an internal resistance of the battery pack 201 at a temperature t. The internal resistance R(t) can be determined in the following manner. For example, the relationship between temperature and internal resistance may be preliminarily determined through experimentation or the like, and stored into the memory 208. Then, the internal resistance R(t) corresponding to a temperature t detected by the temperature sensor (not shown) may be used to partially or completely restrict the output current of the battery pack 201 so as to not exceed the allowable maximum current value of the load.

Figure 4:
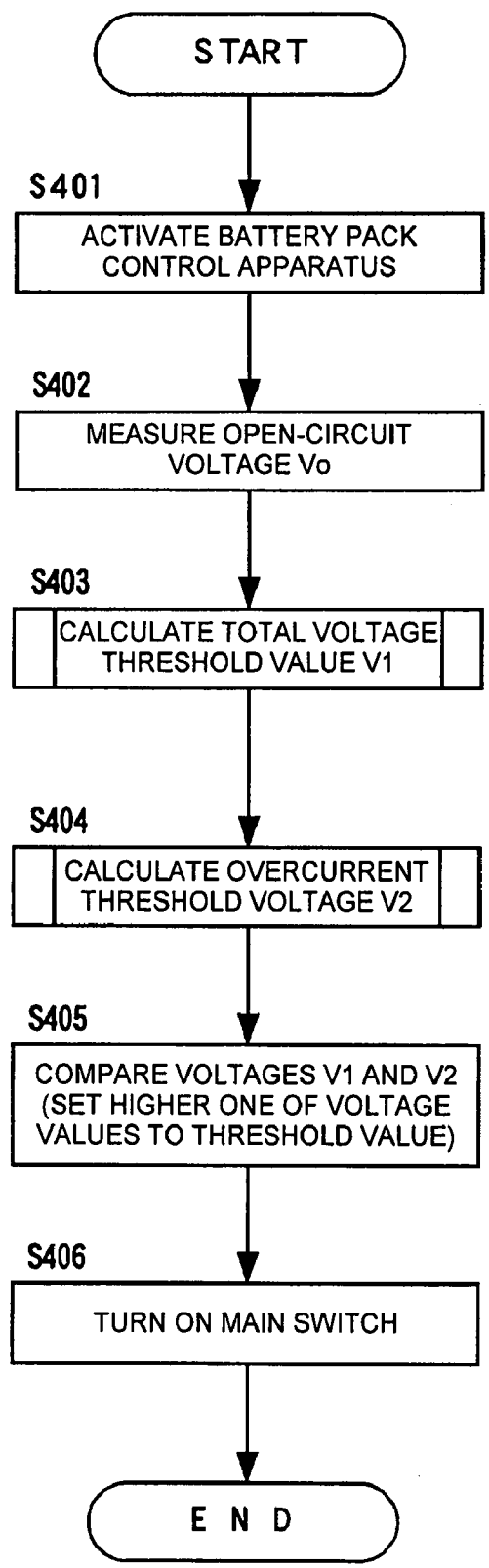
FIG. 4 is a flow chart similar to FIG. 3 additionally taking into consideration the influence of the battery temperature on a battery pack control apparatus such as depicted in FIG. 1.

FIG. 4 is a flow chart showing a procedure of setting the overcurrent threshold voltage V2 in the case where the temperature dependency of the internal resistance R is taken into account. The process from steps S401 to S403 in FIG. 4 is generally that same as from S301 to S303 in FIG. 3, and a detailed description thereof will not be repeated. An overcurrent threshold voltage V2 for preventing the output current from exceeding the maximum current value is calculated (step S404). In this case, the voltage V2 is calculated by the total voltage threshold value determination unit 206 based on the open-circuit voltage Vo of the battery pack measured at step S402, an internal resistance R(t) read from the memory 208 in accordance with temperature data having been input from the temperature sensor (not shown) provided to the battery pack 201, and an allowable maximum current value Imax preliminarily stored in the memory 208. The total voltage threshold value determination unit 206 compares the total voltage threshold value V1 and the overcurrent threshold voltage V2 corresponding to the temperature of the battery pack 201, and the higher one of the voltages V1 and V2 is sent to the supply power restricting unit 203 (step S405). After executing the setting process, the main switch 202 is turned ON so as to start power supply to the load (step S406).

Fourth Embodiment

Figure 5:
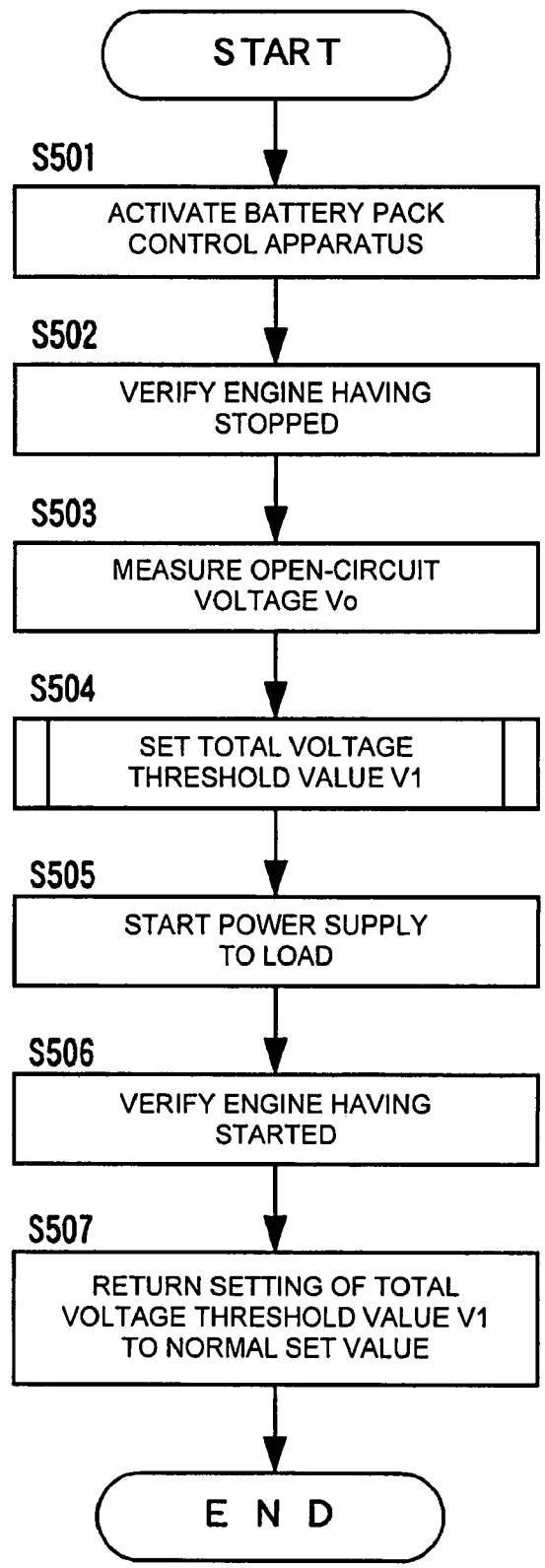
FIG. 5 is a flow chart similar to FIG. 3 illustrating operation of a battery pack control apparatus such as depicted in FIG. 1 in connection with an electric starting motor for an engine of a motor vehicle.

FIG. 5 is a flow chart showing a process for providing discharge current control with a battery pack control apparatus 1 for connecting as the load an engine starting electric motor of a motor vehicle. The battery pack control apparatus 1 is activated (step S501) upon being supplied with power in response to an external operation (e.g., an ignition switch being turned ON by an operator). Subsequently, it is verified that the engine has stopped with the main switch 202 turned OFF (step S502). After verifying that the engine is stopped, the total voltage threshold value V1 is determined and provided to the supply power restricting unit 203 in FIG. 2 (steps S503 and S504), similar to steps S302 and S303 in FIG. 3.

After the supply power limit is set, the main switch 202 is turned ON and power is supplied from the battery pack to the engine starting electric motor (step S505). After supplying the power, the total voltage threshold value determination unit 206 verifies that the engine has started (step S506) and alters the set value to a nominal set value V3 (V3>V1) that permits long-term continual power output. Accordingly, it is possible to minimize the amount of time during which power is supplied just before overdischarge occurs. In this manner, overdischarging of a unit cell may be avoided, reducing the service life of the unit cell may be avoided, and reducing the remaining capacity of the unit cell may be avoided.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

What is claimed is:

1. A battery pack control apparatus for supplying power from a battery pack to a load, the battery pack including a plurality of unit cells electrically connected in series, the battery pack control apparatus comprising:
   a first voltage detecting unit sensing a first voltage, the first voltage corresponding to an output voltage of the battery pack;
   a second voltage detecting unit determining a second voltage, the second voltage corresponding to an output current of the battery pack at which the output voltage of at least one unit cell of the plurality of unit cells is predicted to become equal to a predetermined voltage; and
   a power control unit restricting the power supplied from the battery pack to the load in response to the first voltage being equal to or less than the second voltage.

2. A battery pack control apparatus according to claim 1, wherein the second voltage corresponds to an output current of the battery pack when the output voltage of a lowest voltage unit cell of the plurality of unit cells is predicted to become equal to the predetermined voltage.

3. A battery pack control apparatus according to claim 2, wherein the second voltage detecting unit determines the second voltage based on the output current of the battery pack, an open-circuit voltage of the battery pack, and an internal resistance of the battery pack.

4. A battery pack control apparatus according to claim 3, wherein the second voltage detecting unit determines the output current based on the open-circuit voltage of a lowest open-circuit voltage unit cell of the plurality of unit cells, the internal resistance of a highest internal resistance unit cell of the plurality of unit cells, and the predetermined voltage.

5. A battery pack control apparatus according to claim 3, wherein the second voltage detecting unit senses battery pack temperature and determines the internal resistance of the battery pack relative to the battery pack temperature.

6. A battery pack control apparatus for supplying power from a battery pack to a load, the battery pack including a plurality of unit cells electrically connected in series, the battery pack control apparatus comprising:
   a first voltage detecting unit sensing a first voltage, the first voltage corresponding to a voltage of the battery pack;
   a second voltage detecting unit determining a second voltage, the second voltage corresponding to a voltage of the battery pack when a voltage of at least one unit cell of the plurality of unit cells becomes a predetermined voltage; and
   a power control unit restricting the power supplied from the battery pack to the load in response to the first voltage being equal to or less than the second voltage;
   wherein the second voltage detecting unit determines a third voltage, the third voltage corresponds to a voltage of the battery pack when a maximum current allowed by the load is output from the battery pack, and the power control unit restricts the power supplied from the battery pack to the load when the first voltage is equal to or less than the larger one of the second voltage or the third voltage.

7. A battery pack control apparatus according to claim 1, wherein the load comprises an electric motor starting an internal combustion engine.

8. A battery pack control apparatus according to claim 7, wherein the power control unit restricts the power supplied from the battery pack during an engine start operation when the first voltage is equal to or less than the second voltage, and the power control unit restricts the power supplied from the battery pack after the engine start operation when the first voltage is equal to or less than a threshold voltage that is greater than the second voltage.

9. A battery pack control apparatus according to claim 1, wherein the predetermined voltage comprises a unit cell voltage at which overdischarging begins to occur.

10. A battery pack control apparatus for supplying power from a battery pack to a load, the battery pack including a plurality of unit cells electrically connected in series, the battery pack control apparatus comprising:
    first voltage detecting means for sensing a total voltage output of the battery pack;
    second voltage detecting means for determining a threshold voltage of the battery pack corresponding to an output current when a voltage of at least one unit cell of the plurality of unit cells is predicted to become equal to a predetermined voltage; and
    power control means for at least partially restricting the power supplied from the battery pack to the load in response to the total voltage being equal to or less than the threshold voltage.

11. A battery pack control apparatus according to claim 10, wherein the predetermined voltage comprises a unit cell voltage at which overdischarging begins to occur.

12. A method of controlling a supply of power from a battery pack to a load, the battery pack including a plurality of unit cells electrically connected in series, the method comprising:
    sensing a first voltage, the first voltage corresponding to an output voltage of the battery pack;
    determining a second voltage, the second voltage corresponding to an output current of the battery pack when a voltage of at least one unit cell of the plurality of unit cells is predicted to become equal to a predetermined voltage; and
    restricting the power being supplied from the battery pack to the load when the first voltage is equal to or less than the second voltage.

13. A method of controlling a supply of power from a battery pack to a load, the battery pack including a plurality of unit cells electrically connected in series, the method comprising:

sensing a first voltage, the first voltage corresponding to a voltage of the battery pack;

determining a second voltage, the second voltage corresponding to a voltage of the battery pack when a voltage of at least one unit cell of the plurality of unit cells becomes a predetermined voltage;

restricting the power being supplied from the battery pack to the load when the first voltage is equal to or less than the second voltage;

determining a third voltage corresponding to a voltage of the battery pack when a maximum current allowed by the load is output from the battery pack; and restricting the power being supplied from the battery pack to the load when the first voltage is equal to or less than either the second voltage or the third voltage.

* * * * *